United States Patent
Vaughan

[11] 3,815,728
[45] June 11, 1974

[54] BELT CLEANING SYSTEM

[75] Inventor: Warren R. Vaughan, Ontario, Canada

[73] Assignee: Borg-Warner (Canada) & Ltd., Ontario, Canada

[22] Filed: May 4, 1973

[21] Appl. No.: 357,153

Related U.S. Application Data

[63] Continuation of Ser. No. 158,200, June 30, 1971.

[52] U.S. Cl. .............................................. 198/230
[51] Int. Cl. ............................................ B65g 15/42
[58] Field of Search ............................ 198/230, 229

[56] References Cited
UNITED STATES PATENTS

| | | | |
|---|---|---|---|
| 567,140 | 9/1896 | Hooper | 198/230 |
| 584,238 | 6/1897 | Reagan | 198/230 |
| 1,543,411 | 6/1925 | Wittig | 198/230 |
| 1,609,849 | 12/1926 | Wagner | 198/229 |
| 1,975,591 | 10/1934 | Sinden | 198/230 |
| 2,681,137 | 6/1954 | Davis | 198/230 |

Primary Examiner—Richard E. Aegerter
Attorney, Agent, or Firm—Arthur M. Streich

[57] ABSTRACT

Means comprising floating and idler rolls are arranged with respect to the return flight of a conveyor belt to clean or remove material therefrom.

1 Claim, 3 Drawing Figures

PATENTED JUN 11 1974　　　　　　　　3,815,728

INVENTOR.
WARREN RAYMOND VAUGHAN
BY Aubrey L. Burgen
ATT'Y.

BELT CLEANING SYSTEM

This is a continuation, of application Ser. No. 158,200 filed June 30, 1971.

BACKGROUND OF THE INVENTION

Belt conveyor systems generally include an endless belt, usually made of a resilient rubber-like material and have a carrying flight and a return flight and a number of pulleys including a driven head pulley, a tail pulley and one or more snub pulleys running against outside of the return flight to maintain the belt taut. Such belt conveyors are used to move various ores, limestone, coal and other materials from one location to another. Some material being conveyed may have a relatively high moisture content. Regardless of the material being conveyed, a small amount of dust and fine particles clings and adheres to the conveyor belt and can cause trouble in operating the system, especially when the material must be moved long distances.

Because of the above, many arrangements for cleaning belts have been suggested. For example, it is an old method to use a scraper engaging the belt at the driven head roll or at other locations adjacent to the head roll. Scraper rolls have also been used. While scrapers effectively remove large particles, they are not effective for removing small fines unless forcibly urged against the belt. As readily understood excessive abrasion of the belt and the scraper occurs, requiring frequent repair and/or replacement, and thus increasing the cost of the conveyor system.

SUMMARY OF THE INVENTION

According to this invention one or more pairs of rolls are arranged near the driven head roll to clean the belt. One roll of each pair is a floating roll; it is resiliently urged against the inner surface of the return flight. The outer roll is on a fixed axis and it engages the outside surface of the return flight opposite the floating roll. In the event that wet material is being conveyed, the filed axis rolls run wet in a fluid separator. In either case, the rolls are located at or near the headchute to allow for the disposal of the removed material.

The belt cleaning arrangement just described can be used in conjunction with a scraper arrangement if necessary or desirable; the scraper removing the larger particles while the roll system removes fines. In the wet system, the rolls, removing material from the belt, also squeeze water from the surface to effectively dry the belt.

THE DRAWINGS

DETAILED DESCRIPTION

Figure 1:
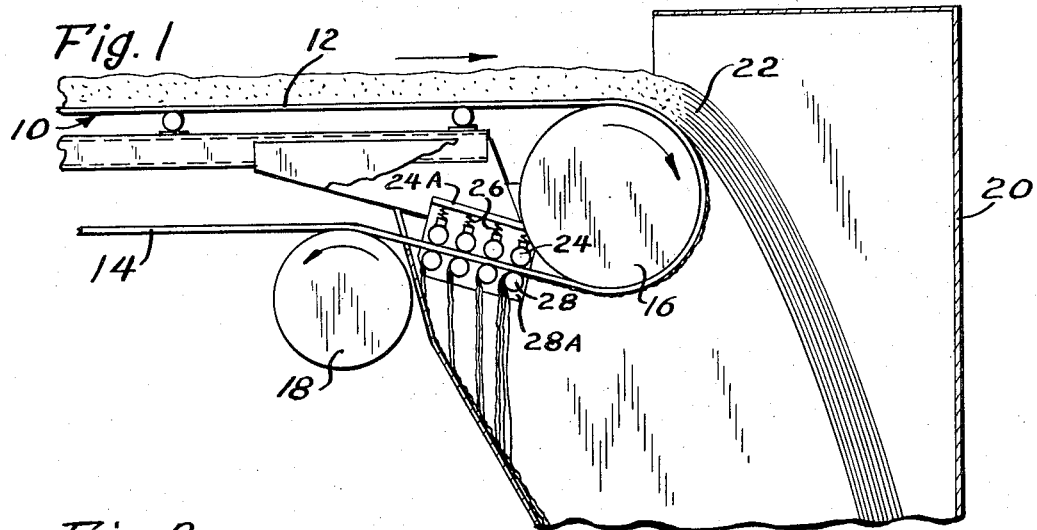
FIG. 1 is a partial side view of a dry material belt cleaning system according to this invention.

In each figure of the drawing, there is illustrated, at least partially, a belt conveying system having an endless belt 10 with a carrying flight 12 and a return flight 14, a head pulley 16 and at least one snub pulley 18.

Figure 2:
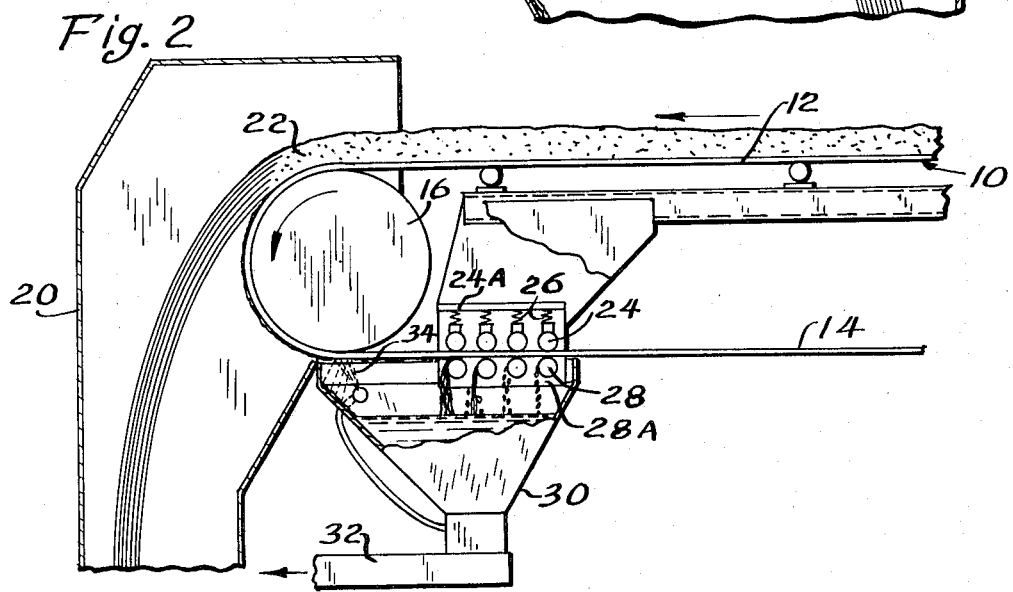
FIG. 2 is a partial side view of a wet material belt cleaning system according to this invention.
Figure 3:
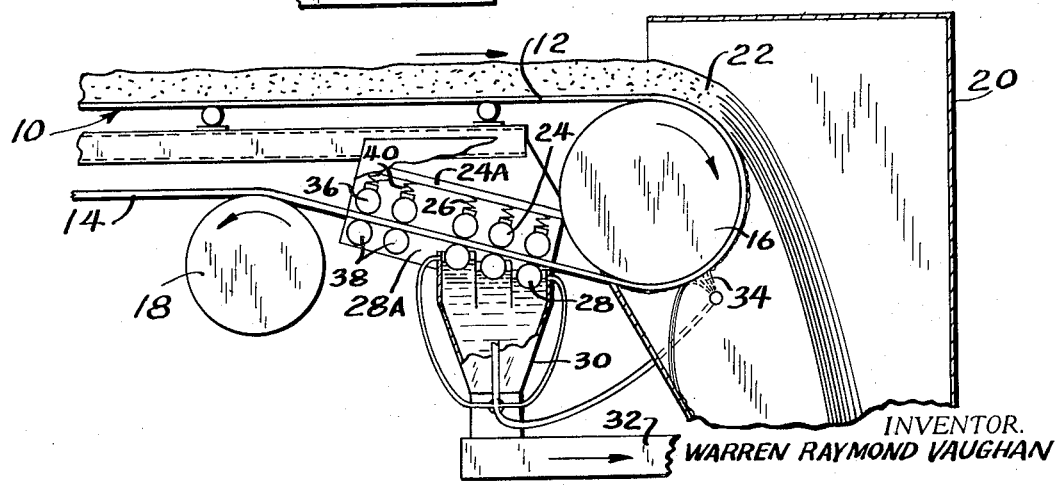
FIG. 3 is a view similar to FIG. 2 showing a modification of the wet material belt cleaning system.

(FIGS. 1 and 3). The tail pulleys are not illustrated in that they do not influence the invention. FIG. 2 does not show a snub pulley; such may be provided if necessary or desirable. In each of the figures there is illustrated a headchute 20 into which material, identified as 22 is discharged from the carrying flight 12 of the belt 10. In each figure, there is shown a plurality of rolls 24 engaging the inside surface of the return flight 14 which are resiliently urged into engagement with the belt surface, as by springs of the like, schematically shown at 26. These rolls 24 have their axes parallel with the belt surface. Generally there are three or more such rolls. Immediately opposite each roll 24 is a roll 28 having a fixed axis which is parallel with the belt surface. The rolls 24 and 28 are suitably journeled on axes supported by supports 24A and 28A. The rolls 28 engage the outside of the return flight 14. Rotation of the rolls 24 and 28 is by frictional contact with the belt 10.

A wet material handling system is illustrated in FIGS. 2 and 3. In each, there is provided a fluid separator 30 having a conduit 32 attached to the headchute 20 for the tailings. A series of water spray jets 34 are directed against the return flight 14, the water being supplied under pressure from a suitable source or being recirculated from the separator 30. In the FIG. 2 embodiment, the rolls 28 run above the water level while on the FIG. 3 embodiment, they run in water. In thus, in FIG. 2, the rolls 28 run out of water, and effectively dry the belt 10. In FIG. 3, there are provided oppositely positioned sets of drying rolls 36, 38 to dry the belt. The upper sets of rolls 36 are resiliently urged toward the belt 10 by springs or the like 40.

It has been found that using the structure just described, the oppositely disposed pairs of rolls 24 and 28, rotating in the same direction as the belt travel, effectively act as squeeges and remove material normally clinging to the belt.

I claim:

1. In apparatus for removing material from a material conveyor belt having both a carrying and a return flight with inside and outside surfaces, and a driven head pulley, the under surfaces engaging the driven head pulley, the improvement comprising:

a floating roll means engaging the inside surface of the return flight, means resiliently urging said floating roll means into engagement with said return flight, a fixed axis idler roll means directly opposite said floating roll means and engaging the outside surface of the return flight, both said roll means being arranged for rotation freely about their axes, means to supply cleaning fluid to said belt in advance of said roll means, said roll means engaging and removing material adhering to the outside surface of the return flight, a headchute positioned for receiving material removed from said belt; and a separator means below said roll means for separating liquid and material removed from said belt, said separator means being connected to said headchute to discharge removed material therefrom.

* * * * *